(12) United States Patent
Biadsy et al.

(10) Patent No.: US 11,823,685 B2
(45) Date of Patent: *Nov. 21, 2023

(54) SPEECH RECOGNITION

(71) Applicant: Google LLC, Mountain View, CA (US)

(72) Inventors: Fadi Biadsy, Mountain View, CA (US);
Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,601

(22) Filed: Jan. 25, 2023

(65) Prior Publication Data
US 2023/0169983 A1    Jun. 1, 2023

Related U.S. Application Data

(63) Continuation of application No. 17/153,495, filed on Jan. 20, 2021, now Pat. No. 11,580,994.

(Continued)

(51) Int. Cl.
*G10L 17/22* (2013.01)
*G10L 17/02* (2013.01)
(Continued)

(52) U.S. Cl.
CPC .............. *G10L 17/22* (2013.01); *G10L 15/22* (2013.01); *G10L 17/02* (2013.01); *G10L 17/04* (2013.01);
(Continued)

(58) Field of Classification Search
CPC ......... G10L 17/22; G10L 15/22; G10L 17/02; G10L 17/04; G10L 17/14; G10L 17/26; G10L 2015/227
(Continued)

(56) References Cited

U.S. PATENT DOCUMENTS 8,396,709 B2 * 3/2013 Lloyd .................... H04M 1/04
704/231
10,438,587 B1 * 10/2019 Lam ....................... G10L 15/14
(Continued)

FOREIGN PATENT DOCUMENTS

EP    1089193 A2    4/2001

OTHER PUBLICATIONS

International Search Report for the related Application No. PCT/US2021/014186, dated May 3, 2021, 11 pages.

(Continued)

*Primary Examiner* — Edwin S Leland, III
(74) *Attorney, Agent, or Firm* — Honigman LLP; Brett A. Krueger; Grant J. Griffith

(57) ABSTRACT

A method includes receiving acoustic features of a first utterance spoken by a first user that speaks with typical speech and processing the acoustic features of the first utterance using a general speech recognizer to generate a first transcription of the first utterance. The operations also include analyzing the first transcription of the first utterance to identify one or more bias terms in the first transcription and biasing the alternative speech recognizer on the one or more bias terms identified in the first transcription. The operations also include receiving acoustic features of a second utterance spoken by a second user that speaks with atypical speech and processing, using the alternative speech recognizer biased on the one or more terms identified in the first transcription, the acoustic features of the second utterance to generate a second transcription of the second utterance.

20 Claims, 5 Drawing Sheets

Related U.S. Application Data

(60) Provisional application No. 62/967,949, filed on Jan. 30, 2020.

(51) Int. Cl.
  *G10L 17/04* (2013.01)
  *G10L 17/14* (2013.01)
  *G10L 15/22* (2006.01)
  *G10L 17/26* (2013.01)

(52) U.S. Cl.
  CPC ............. *G10L 17/14* (2013.01); *G10L 17/26* (2013.01); *G10L 2015/227* (2013.01)

(58) Field of Classification Search
  USPC ......................................................... 704/235
  See application file for complete search history.

(56) References Cited

U.S. PATENT DOCUMENTS

| | | | | |
|---|---|---|---|---|
| 11,176,484 | B1* | 11/2021 | Dorner | G06F 16/738 |
| 2004/0230430 | A1* | 11/2004 | Gupta | G09B 19/06 |
| | | | | 704/235 |
| 2014/0195227 | A1* | 7/2014 | Rudzicz | G10H 1/366 |
| | | | | 704/231 |
| 2015/0032448 | A1* | 1/2015 | Wasserblat | G06F 16/60 |
| | | | | 704/235 |
| 2016/0133251 | A1* | 5/2016 | Kadirkamanathan | G06F 40/216 |
| | | | | 704/9 |
| 2016/0316059 | A1* | 10/2016 | Nuta | G10L 15/04 |
| 2017/0032781 | A1* | 2/2017 | Sharifi | G06F 40/30 |
| 2017/0236511 | A1* | 8/2017 | Zhao | G10L 15/22 |
| | | | | 704/240 |
| 2018/0005645 | A1* | 1/2018 | Khaleghi | G16H 50/20 |
| 2019/0348065 | A1* | 11/2019 | Talwar | G10L 25/78 |
| 2019/0392055 | A1* | 12/2019 | Rose | G06F 16/5838 |
| 2021/0241777 | A1* | 8/2021 | Bladsy | G10L 17/22 |
| 2021/0339024 | A1* | 11/2021 | Naor | A61N 1/37247 |
| 2022/0122596 | A1* | 4/2022 | Jessa | G10L 15/197 |
| 2022/0139418 | A1* | 5/2022 | Aida | G10L 25/78 |
| | | | | 704/233 |

OTHER PUBLICATIONS

Hawley M S et al : "A Voice-Input Voice-Output Communication Aid for People With Severe Speech Impairment", IEEE Transactions on Neural Systems and Rehabilitation Engineering, IEEE Service Center, New York, NY, US, vol. 21, No. 1, Jan. 1, 2013 (Jan. 1, 2013), pp. 23-31, XP011493281, ISSN: 1534-4320, DOI: 10.1109/TNSRE .2012.2209678 abstract; figure 1 p. 23, right-hand column, l ine 46—p. 24, l eft-hand column, line 5 p. 24, l eft-hand column, l i ne 51—right-hand column, line 4.

USPTO. Office Action relating to U.S. Appl. No. 17/153,495, dated May 11, 2022.

* cited by examiner

SPEECH RECOGNITION

CROSS REFERENCE TO RELATED APPLICATIONS

This U.S. patent application is a continuation of, and claims priority under 35 U.S.C. § 120 from, U.S. patent application Ser. No. 17/153,495, filed on Jan. 20, 2021, which claims priority under 35 U.S.C. § 119(e) to U.S. Provisional Application 62/967,949, filed on Jan. 30, 2020. The disclosures of these prior applications are considered part of the disclosure of this application and are hereby incorporated by reference in their entireties.

TECHNICAL FIELD

This specification generally relates to speech processing.

BACKGROUND

Speech processing is the study of speech signals and the processing methods of signals. The signals are usually processed in a digital representation, so speech processing can be regarded as a case of digital signal processing, applied to speech signals. Aspects of speech processing includes the acquisition, manipulation, storage, transfer, and output of speech signals.

SUMMARY

It can be challenging for a speaker with atypical speech (e.g., apraxia, cluttering, developmental verbal dyspraxia, dysarthria, dysprosody, speech sound disorders, stuttering, voice disorders, lisp, etc.) to ensure that others are able to understand what the speaker is saying. It would be helpful to utilize speech recognition technology to assist the others by transcribing the speaker's speech and outputting the transcription in a user interface or through synthesized speech. However, just as listeners may have difficulty understanding a speaker with atypical speech, speech recognizers may suffer from decreased accuracy when transcribing atypical speech.

To overcome this challenge, it may be helpful to determine the context of the conversation between the speaker with atypical speech and another speaker with typical speech. A system may employ multiple speech recognizers and selectively activate one of them depending on whether the system detects atypical speech or typical speech.

The system may use a general speech recognizer to generate a transcription of speech from a speaker with typical speech. The system may use that transcription to determine the context of the conversation to bias an alternative speech recognizer. The system may use the biased alternative speech recognizer when transcribing speech from a speaker with atypical speech. By biasing the alternative speech recognizer, the system may improve the accuracy of the transcription of the speech from a speaker with typical speech.

This may be helpful in various types of situations. One example may involve a telephone conversation between two people, one who speaks with atypical speech and one who speaks with typical speech. The system may use the transcriptions of the dialog of the speaker who speaks with typical speech to bias an alternative speech recognizer. The system uses the biased alternative speech recognizer to perform speech recognition on the dialog of the speaker who speaks with atypical speech. The system can output a transcription of the dialog of the speaker with atypical speech or output synthesized speech so that the speaker who speaks with typical speech is able to better understand the speaker who speaks with atypical speech.

One aspect of the present disclosure provides a computer-implemented method that when executed on data processing hardware causes the data processing hardware to perform operations that include: receiving acoustic features of a first utterance spoken by a first user that speaks with typical speech; processing, using a general speech recognizer, the acoustic features of the first utterance to generate a first transcription of the first utterance; analyzing the first transcription of the first utterance to identify one or more bias terms in the first transcription for biasing an alternative speech recognizer; and biasing the alternative speech recognizer on the one or more bias terms identified in the first transcription. The operations also include: receiving acoustic features of a second utterance spoken by a second user that speaks with atypical speech; and processing, using the alternative speech recognizer biased on the one or more bias terms identified in the first transcription, the acoustic features of the second utterance to generate a second transcription of the second utterance.

Implementations of the disclosure may include one or more of the following optional features. In some implementations, the operations also include displaying the second transcription of the second utterance on a display of a user device associated with the first user and/or generating a synthetic speech representation for the second transcription of the second utterance and providing the synthetic speech representation for audible output from a user device associated with the first user. In some examples, the operations also include, after receiving the acoustic features of the second utterance spoken by the second user that speaks with atypical speech: performing speaker recognition on the acoustic features of the second utterance to identify the speaker of the second utterance as the second user that speaks with atypical speech; and selecting the alternative speech recognizer to perform speech recognition on the acoustic features of the second utterance based on the speaker recognition performed on the acoustic features of the second utterance identifying the second user as the speaker of the second utterance.

In some other examples, the operations also include, after receiving the acoustic features of the second utterance spoken by the second user that speaks with atypical speech: generating, using a speech classifier model, an output indicating that the acoustic features of the second utterance are associated with an utterance spoken by a speaker with atypical speech; and selecting the alternative speech recognizer to perform speech recognition on the acoustic features of the second utterance based on the output generated by the speech classifier model that indicates the acoustic features of the second utterance area associated with the utterance spoken by the speaker with atypical speech. In these other examples, the speech classifier model may be trained on atypical training utterances that include respective labels indicating that the atypical training utterances are spoken by speakers with atypical speech. Here, the atypical training utterances may include utterances spoken by speakers who have at least one of apraxia of speech, deaf speech, cluttering, developmental verbal dyspraxia, dysarthria, dysprosody, a speech sound disorders, slurred speech, stuttering, a voice disorder, or a lisp. The speech classifier model may also be trained on typical training utterances that include respective labels indicating that the typical training utterances are spoken by speakers with typical speech.

In some implementations, analyzing the first transcription of the first utterance to identify one or more bias terms in the first transcription includes identifying the one or more bias terms by identifying non-functional terms in the first transcription. Analyzing the first transcription of the first utterance to identify one or more bias terms in the first transcription may include performing a term frequency-inverse document frequency (tf-idf) analysis on the first transcription to identify the one or more bias terms. Additionally or alternatively, analyzing the first transcription of the first utterance to identify one or more bias terms in the first transcription may include identifying mutual information included in multiple transcriptions generated by the general speech recognizer during an ongoing conversation between the first user and the second user.

The first utterance may be captured by a first user device associated with the first user and the data processing hardware may reside on the first user device. In other configurations, the data processing hardware resides on a remote computing device in communication with the first user device.

Another aspect of the disclosure provides a system that includes data processing hardware and memory hardware in communication with the data processing hardware and storing instructions that when executed by the data processing hardware cause the data processing hardware to perform operations that include: receiving acoustic features of a first utterance spoken by a first user that speaks with typical speech; processing, using a general speech recognizer, the acoustic features of the first utterance to generate a first transcription of the first utterance; analyzing the first transcription of the first utterance to identify one or more bias terms in the first transcription for biasing an alternative speech recognizer; and biasing the alternative speech recognizer on the one or more bias terms identified in the first transcription. The operations also include: receiving acoustic features of a second utterance spoken by a second user that speaks with atypical speech; and processing, using the alternative speech recognizer biased on the one or more bias terms identified in the first transcription, the acoustic features of the second utterance to generate a second transcription of the second utterance.

This aspect may include one or more of the following optional features. In some implementations, the operations also include displaying the second transcription of the second utterance on a display of a user device associated with the first user and/or generating a synthetic speech representation for the second transcription of the second utterance and providing the synthetic speech representation for audible output from a user device associated with the first user. In some examples, the operations also include, after receiving the acoustic features of the second utterance spoken by the second user that speaks with atypical speech: performing speaker recognition on the acoustic features of the second utterance to identify the speaker of the second utterance as the second user that speaks with atypical speech; and selecting the alternative speech recognizer to perform speech recognition on the acoustic features of the second utterance based on the speaker recognition performed on the acoustic features of the second utterance identifying the second user as the speaker of the second utterance.

In some other examples, the operations also include, after receiving the acoustic features of the second utterance spoken by the second user that speaks with atypical speech: generating, using a speech classifier model, an output indicating that the acoustic features of the second utterance are associated with an utterance spoken by a speaker with atypical speech; and selecting the alternative speech recognizer to perform speech recognition on the acoustic features of the second utterance based on the output generated by the speech classifier model that indicates the acoustic features of the second utterance area associated with the utterance spoken by the speaker with atypical speech. In these other examples, the speech classifier model may be trained on atypical training utterances that include respective labels indicating that the atypical training utterances are spoken by speakers with atypical speech. Here, the atypical training utterances may include utterances spoken by speakers who have at least one of apraxia of speech, deaf speech, cluttering, developmental verbal dyspraxia, dysarthria, dysprosody, a speech sound disorders, slurred speech, stuttering, a voice disorder, or a lisp. The speech classifier model may also be trained on typical training utterances that include respective labels indicating that the typical training utterances are spoken by speakers with typical speech.

In some implementations, analyzing the first transcription of the first utterance to identify one or more bias terms in the first transcription includes identifying the one or more bias terms by identifying non-functional terms in the first transcription. Analyzing the first transcription of the first utterance to identify one or more bias terms in the first transcription may include performing a term frequency-inverse document frequency (tf-idf) analysis on the first transcription to identify the one or more bias terms. Additionally or alternatively, analyzing the first transcription of the first utterance to identify one or more bias terms in the first transcription may include identifying mutual information included in multiple transcriptions generated by the general speech recognizer during an ongoing conversation between the first user and the second user.

The first utterance may be captured by a first user device associated with the first user and the data processing hardware may reside on the first user device. In other configurations, the data processing hardware resides on a remote computing device in communication with the first user device.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
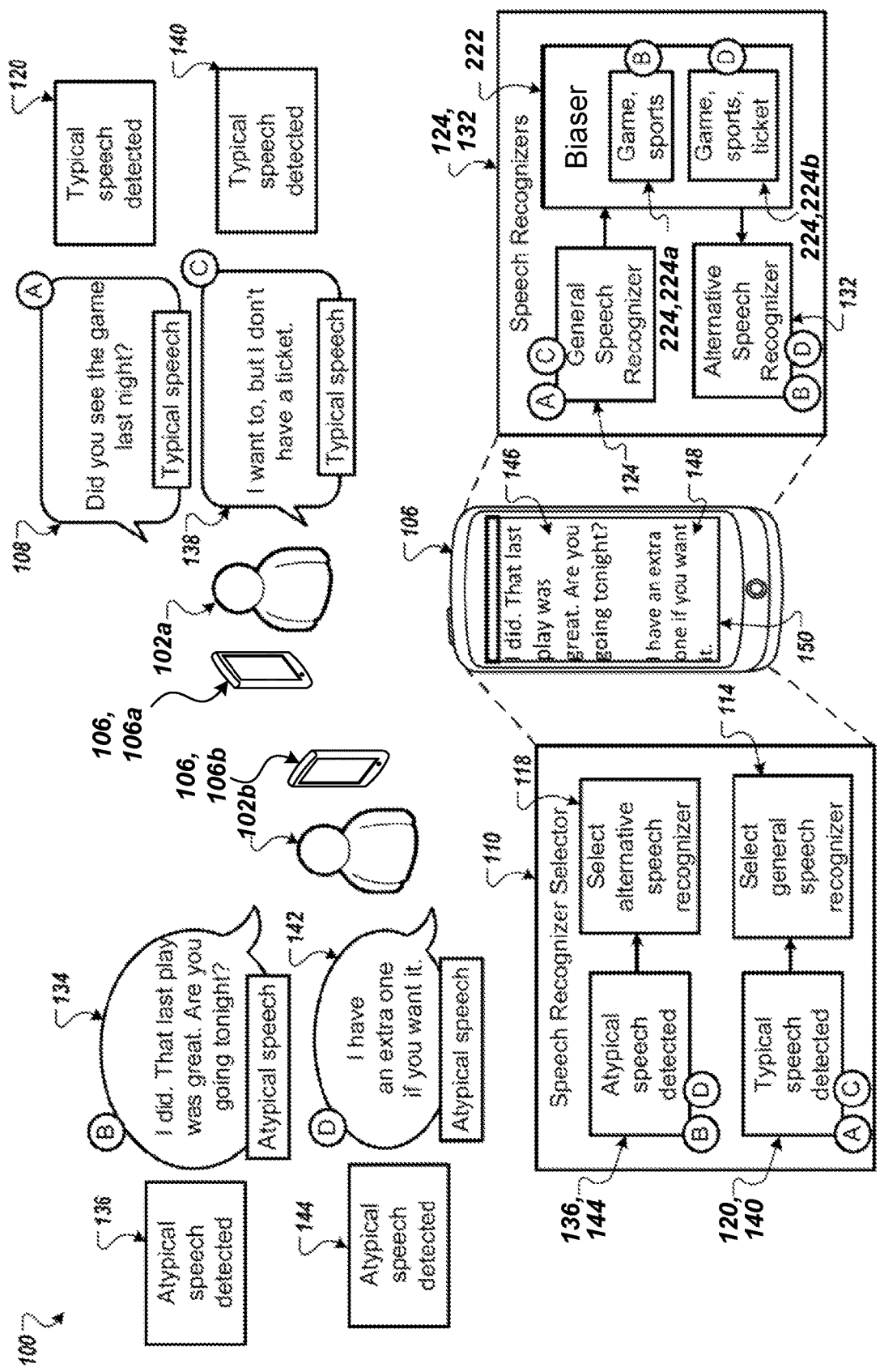
FIG. 1 is a schematic view of an example environment of two users having a conversation, where a computing device outputs transcriptions of a user's speech for the user who speaks with atypical speech.

FIG. 1 illustrates an example environment 100 of two users 102a, 102b having a conversation, where a computing device 106 outputs transcriptions 146, 146*a-b* of the speech spoken by the user 102*b* who speaks with atypical speech. Briefly, and as described in more detail below, user 102*a*, who speaks with typical speech, is having a conversation with user 102*b*, who speaks with atypical speech. To assist the user 102*a* in understanding the user 102*b*, the computing device 106 provides a graphical interface 150 that includes the transcriptions 146*a*, 146*b* of utterances 134, 142 spoken by the user 102*b*. The computing device 106 improves the accuracy of speech recognition performed on atypical speech from the user 102 by biasing an alternative speech recognizer 132 configured to recognize atypical speech. The conversation may include a telephone conversation via respective user devices 106, 106*a-b* (e.g., smart phones). In other examples, the users 102*a*, 102*b* may be having an in-person conversation in which a single user device 106 is capturing utterances 108, 134, 138, 142 spoken by both users 102*a*, 102*b*.

In more detail, the user 102*b* speaks with atypical speech that can sometimes make it difficult for others to understand the user 102*b*, while the user 102*a* does not speak with atypical speech. The user 102 may use the user device 106 to assist in understanding the user 102*b* with atypical speech. The user device 106 may correspond to a computing device having multiple speech recognizers 124, 132. For instance, the user device 106 may use a general speech recognizer 124 to perform speech recognition on speech that does not include atypical speech and an alternative speech recognizer 132 to perform speech recognition on atypical speech. More specifically, the general speech recognizer 124 may be trained on speech dominated by speakers who speak with typical speech making it difficult for the general speech recognizer 124 to accurately recognize speech spoken by users with atypical speech. The alternative speech recognizer 132 is trained on speech utterances spoken by speakers who have various types of speech disorders such as, without limitation, apraxia of speech, cluttering, developmental verbal dyspraxia, dysarthria, dysprosody, speech sound disorders, slurred speech, stuttering, voice disorders, lisp, or any other similar speech disorder that can make it difficult for others to understand In stage A, the user 102*a* speaks the utterance 108, "Did you see the game last night?" The user device 106 may include a microphone 204 (FIG. 2) that captures the utterance 108. The user device 106 includes a speech recognizer selector 110 that is configured to determine whether the user 102*a* who spoke the captured utterance 108 spoke with atypical speech. Based on decision 120 that indicates that the utterance 108 does not include atypical speech, the speech recognizer selector 110 reaches decision 114 that indicates to select the general speech recognizer 124.

The user device 106 performs speech recognition on audio data characterizing the utterance 108 using the general speech recognizer 124. The general speech recognizer 124 outputs an ASR result 218 (FIG. 2) for the utterance 108 and provides the ASR result 218 for the utterance 108 to a speech recognition biaser 222. The speech recognition biaser 222 is configured to select terms 224 and classes to bias the alternative speech recognizer 132. In this example, the speech recognition biaser 222 determines that the utterance 108 is related to sports and biases the alternative speech recognizer 132 to the class of terms 224*a* related to sports. The speech recognition biaser also identifies the term "game" as an appropriate term 224*a* to bias the alternative speech recognizer 132.

In stage B, the user 102*b* speaks the utterance 134, "I did. That last play was great. Are you going tonight?" The speech of the user 102*b* is atypical and that may make it difficult for the user 102*a* to understand what the user 102*b* is saying. Speaking with atypical speech may also make it difficult for the general speech recognizer 124 to accurately perform speech recognition on the audio data of the utterance 104. The microphone of the user device 106 captures the utterance 134 and converts the utterance 132 into audio data (e.g., acoustic features 205 (FIG. 2)) characterizing the utterance 132 in a digital format. The speech recognizer selector 110 analyzes the audio data of the utterance 134 and determines that the utterance 134 includes atypical speech as depicted by decision 136.

Based on the speech recognizer selector 110 determining that the utterance 134 includes atypical speech, the speech recognizer selector 110 instructs the user device 106 to perform speech recognition on the audio data using the alternative speech recognizer 132. The alternative speech recognizer 132 may access/receive the bias terms 224 identified by the biaser 222 for use in biasing the alternative speech recognizer 132 towards those terms 224*a* that includes the term "game" and the set of terms related to the sports class. The alternative speech recognizer 132 generates the transcription 146 of "I did. That last play was great. Are you going tonight?"

To assist the user 102*a* in understanding the user 102*b*, the user device 106 generates a graphical interface 150 that includes the transcription 146. The user device 106 outputs the graphical interface 150 to the display of the user device 106. The user 102*a* is able to view "I did. That last play was great. Are you going tonight?" on the display of the user device 106. The user device 106 may additionally or alternatively audibly output a synthesized speech representation of the transcription 146.

In stage C, the conversation between the user 102*a* and the user 102*b* continues with the user 102*a* responding with utterance 138, "I want to, but I don't have a ticket." The microphone of the user device 106 captures the utterance 138 and converts the utterance 138 into audio data (e.g., acoustic features 205 (FIG. 2)) to characterize the utterance 138 in a digital format. The speech recognizer selector 110 analyzes the audio data of the utterance 138. The speech recognizer selector 110 determines that the utterance 138 was spoken by a user who does not speak with atypical speech as depicted by decision 140.

The speech recognizer selector 110 provides instructions to the general speech recognizer 124 to perform speech recognition on the audio data of the utterance 138. In some implementations, the computing device 106 does not bias the general speech recognizer 124. The general speech recognizer 124 generates an ASR result 218 of the utterance 138 and provides the ASR result 218 of the utterance 138 to the speech recognition biaser 222. In this example, the speech recognition biaser 222 determines that the utterance 138 identifies the term "ticket" as a term 224, 224*b* to bias the alternative speech recognizer 132. The speech recognition biaser 222 adds the term "ticket" as a term 224*b* to bias the alternative speech recognizer 132 such that the biasing terms 224 now include the terms "game" and "ticket" and the set of terms related to the "sports" class.

In some implementations, the speech recognition biaser 222 analyzes the cumulative utterances spoken by the user 102*a* to determine the terms 224 to bias the alternative speech recognizer 132. For example, the speech recognition biaser 222 may analyze both the ASR results 218 for the utterance 108 and the utterance 138 to determine the biased terms 224 for any subsequent utterances. In this case, the speech recognition biaser 222 may identify the terms "game" and "ticket" and the set of terms related to the "sports" class based on analyzing the ASR results 218 for the utterances 108,138 spoken by the speaker 102*a* with typical speech.

In some implementations, the speech recognition biaser 222 analyzes the most recent utterance spoken by the user 102*a* to determine the terms 224 and sets of terms related to identified classes to add to the previously identified terms 224. For example, the speech recognition biaser 222 may analyze the utterance 138 to determine the additional biased terms 224*b*. In this case, the speech recognition biaser 222 may identify the term "ticket" based on analyzing the ASR result 224 for the utterance 138. The speech recognition biaser 222 may store the previously identified terms 224*a* along with the new term "ticket" 224*b* in memory hardware residing on the user device 106. The speech recognition biaser 222 may bias the alternative speech recognizer 132 using the biased terms 224, 224*a-b*.

In stage D, the user 102*b* speaks the utterance 142, "I have an extra one if you want it." The user 102*b* continues to speak with atypical speech. The microphone of the user device 106 captures the utterance 142 and converts the utterance 142 into audio data characterizing the utterance 142. The speech recognizer selector 110 analyzes the audio data of the utterance 142 and determines that the utterance 142 was spoken by a user with atypical speech as depicted by decision 144.

Based on the speech recognizer selector 110 determining that the utterance 142 was spoken by a user with atypical speech, the speech recognizer selector 110 instructs the user device 106 to perform speech recognition on the audio data. The alternative speech recognizer 132 accesses/receives the biased terms 224 and biases the alternative speech recognizer 132 towards the biased terms 224*a* that includes the terms "game" and the set of terms related to the "sports" class, as well as the biased terms 224*b* that includes the term "ticket". The alternative speech recognizer 132 generates the transcription 148 of "I have an extra one if you want it."

The user device 106 updates the graphical interface 150 to include the transcription 148. The user device 106 outputs the graphical interface 150 to the display of the user device 106. The user 102 is able to view "I have an extra one if you want it" on the display of the computing device 106. The user device 106 may additionally or alternatively audibly output a synthesized speech representation of the transcription 148.

Figure 2:
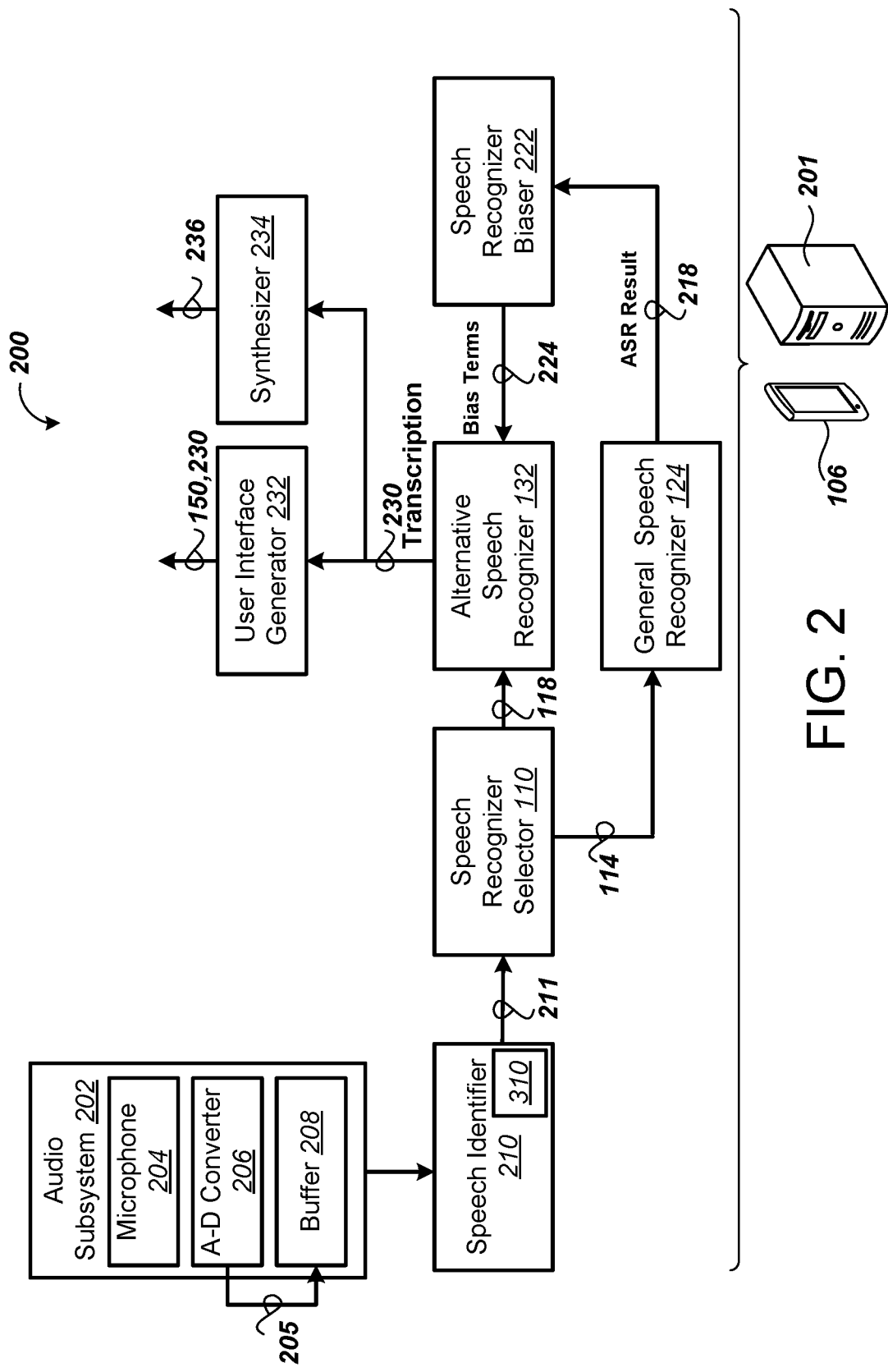
FIG. 2 is a schematic view of an example automated speech recognition (ASR) system that performs speech recognition on typical speech and atypical speech.

FIG. 2 illustrates an example automated speech recognition (ASR) system 200 that performs speech recognition on typical speech and atypical speech. In some implementations, the ASR system 200 resides on a user device 106 of a user 102, 104 and/or on a remote computing device 201 (e.g., one or more servers of a distributed system executing in a cloud-computing environment) in communication with the user device. In some examples, a portion of the components of the ASR system 200 reside on the user device 106, while a remaining portion of the components reside on the remote computing device 201. Although the user device 106 is depicted as a mobile computing device (e.g., a smart phone), the user device 106 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

The ASR system 200 includes an audio subsystem 202 that is implemented on a user device 106 while the other components of the system 200 may reside on the user device 106 and/or the remote system 201. The audio subsystem 202 may include one or more microphones 204, analog-to-digital (A-D) converter 206, buffer 208, and various other audio filters. The one or more microphones 204 are configured to capture audio such as speech spoken by a user 102 and the A-D converter 206 is configured to convert the audio into a corresponding digital format associated with input acoustic features 205 capable of being processed by various components of the ASR system 200. In some examples, the acoustic features 205 include a series of parameterized input acoustic frames that each include 80-dimensional log-Mel features, computed with short, e.g., 25 milliseconds (ms), window and shifted every, e.g., 10 ms. The buffer 208 may store the most recent acoustic features 205 (e.g., last 10 seconds) sampled from the corresponding audio captured by the one or more microphones 204 for further processing by the ASR system 200. Other components of the ASR system 200 may access and store acoustic features 205 in the buffer 208 for further processing.

In some implementations, the ASR system 200 includes a speaker identifier 210 configured to receive the acoustic features 205 from the audio subsystem 202 and determine whether the acoustic features 205 are associated with an utterance spoken by a speaker with atypical speech or an utterance spoken by a speaker with typical speech. The speaker identifier 210 may generate an output 211 indicating whether the acoustic features 205 are associated with atypical speech or typical speech. For instance, each of the typical speech detected decisions 120, 140 and each of the atypical speech detected decisions 136, 144 depicted in FIG. 1 may include a corresponding output 211 generated by the speaker identifier 210. In some examples, the speaker identifier 210 performs speaker recognition/identification by processing the acoustic features 205 to generate a speaker embedding (e.g., a d-vector or i-vector) and determine whether the speaker embedding matches a stored speaker embedding for a user with atypical speech or typical speech. A speaker embedding may match a stored speaker embedding when an embedding distance there between satisfies a distance threshold.

Figure 3:
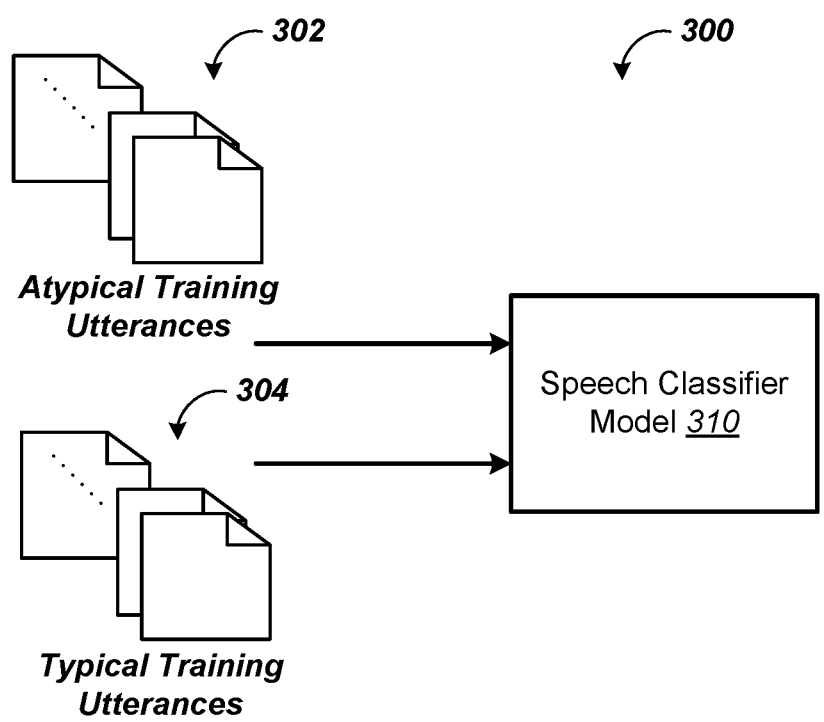
FIG. 3 is a schematic view of an example training procedure for training a speech classifier model.

In additional examples, the speaker identifier 210 includes a speech classifier model 310 trained to receive acoustic features 205 as input and generate the output 211 indicating whether the acoustic features 205 are associated with an utterance spoken by a speaker with atypical speech or a speaker with atypical speech. For instance, FIG. 3 shows an example training procedure 300 for training the speech classifier model 310. The speech classifier model 310 may be a neural network-based model. The training procedure 300 trains the speech classifier model 310 on atypical training utterances 302 that include utterances spoken by speakers with atypical speech. The atypical training utterances 302 may include utterances spoken by speakers who have various types of speech disorders such as, without limitation, apraxia of speech, cluttering, developmental verbal dyspraxia, dysarthria, dysprosody, speech sound disorders, slurred speech, stuttering, voice disorders, lisp, or any other similar speech disorder that can make it difficult for others to understand. The atypical training utterances 302 may be labeled to teach the speech classifier model 310 to classify utterances spoken by atypical speakers as atypical speech. In some scenarios, the model 310 is trained to generate outputs 211 indicating whether utterances were spoken by speakers with particular types of atypical speech. For instance, an output 211 could indicate that acoustic features associated with an utterance spoken by a speaker with dysarthria includes dysarthria while an output 211 could indicate that other acoustic features associated with another utterance spoken by a different speaker who is deaf includes deaf speech. In these scenarios, the model 310 is trained on atypical training utterances 302 explicitly labeled as including dysarthria atypical speech as well as atypical training utterances 302 explicitly labeled as including deaf speech. The model 310 could be trained to generate outputs 211 indicating any number of different particular types of atypical speech to provide more granularity. In this manner, each type of atypical speech may be associated with a respective alternative speech recognizer 132 that is personalized for recognizing the particular type of atypical speech.

Additionally or alternatively, the training procedure 300 may train the speech classifier model 310 on typical training utterances 304 that include utterances spoken by speakers with typical speech. As with the atypical training utterances 302, the typical training utterances 304 may be labeled to teach the speech classifier model 310 to classify utterances spoken by typical speakers as typical speech.

The system 200 also includes the speech recognizer selector 112. The speech recognizer selector 112 is configured to receive the output 211 generated by the speaker identifier 210 indicating whether the acoustic features 205 include an utterance spoken by a speaker with typical speech or atypical speech. If the output 211 received by the speech recognizer selector 112 indicates that the acoustic features 205 include an utterance spoken by a speaker with atypical speech, the speech recognizer selector 112 selects (e.g., via decision 118) the alternative speech recognizer 132 to perform speech recognition on the acoustic features 205. If the speech recognizer selector 112 receives the output 211 indicating that the audio features 205 does not include an utterance spoken by a speaker with atypical speech, the speech recognizer selector 112 selects (e.g., via decision 114) the general speech recognizer 124 to perform speech recognition on the acoustic features 205.

In some implementations, the speaker identifier 210 is configured to identify different types of atypical speech. For example, the speaker identifier 210 may be configured to determine whether the speaker speaks without atypical speech, with dysarthric speech, or with apraxia of speech. That is, the speaker identifier 210 may implement the speaker classifier model 310 to generate outputs 211 indicating the different types of atypical speech and typical speech and/or the speaker identifier 210 may simply perform speaker recognition on received acoustic features 205 to determine if a speaker embedding matches a stored speaker embedding for a speaker known to speak with a particular type of atypical speech or typical speech. In the example, the ASR system 200 may include three speech recognizers: the general speech recognizer 124 for recognizing typical speech; a first alternative speech recognizer 132 trained to recognize dysarthric speech; and a second alternative speech recognizer 132 trained to recognize apraxia of speech. The speech recognizer selector 110 may select the general speech recognizer 124 if the speaker identifier 210 generates an output 211 that the speaker does not speak with atypical speech. The speech recognizer selector 110 may select the first alternative speech recognizer 132 for speakers with dysarthric speech if the speaker identifier 110 generates an output 211 indicating that the speaker has dysarthric speech. The speech recognizer selector 110 may select the second alternative speech recognizer 132 for speakers with apraxia of speech if the speaker identifier 210 generates the output 211 indicating that the speaker has apraxia of speech.

In instances where the speech recognizer selector 110 selects the general speech recognizer 124 via decision 114, the general speech recognizer 124 receives the acoustic features 205 from the audio subsystem 202 or from a storage device that stores the acoustic features 205 received from the audio subsystem 202. The general speech recognizer 124 performs speech recognition on the acoustic features 205 to generate an ASR result 218 for the utterance spoken by the speaker with typical speech.

The speech recognizer biaser 222 accesses/receives the ASR result 218 generated by the general speech recognizer 124 and biases the alternative speech recognizer 132 using the ASR result 218. Specifically, the speech recognizer biaser 222 is configured to identify the most prominent terms 224 in the ASR result 218 and bias the alternative speech recognizer 132 towards those terms 224. Thus, the prominent terms 224 identified in the ASR result 217 by the biaser 222 may be referred to as bias terms 224 for biasing the alternative speech recognizer 132. In some implementations, the speech recognizer biaser 222 identifies the prominent terms by identifying the most repeated non-functional terms in the ASR result 218. In additional implementations, the speech recognizer biaser 222 identifies the prominent terms 224 by performing a term frequency-inverse document frequency (tf-idf) analysis on the ASR result 218. Additionally or alternatively, the speech recognizer biaser 222 may identify the prominent terms by identifying mutual information included in multiple ASR results 218 generated by the general speech recognizer 124 during an ongoing conversation.

In some implementations, the speech recognizer biaser 222 uses a decay function to determine the prominent terms 224 to bias the alternative speech recognizer 132. In this case, the speech recognizer biaser 222 assigns a weight to each term 224 and reduces that weight as the ASR system 200 receives additional utterances that do not include previously identified terms. For example, if the speech recognizer biaser 222 identifies the terms "snow" and "ice" in a first utterance and then identifies the term "rain" in the following utterance, then the speech recognizer biaser 222 may bias the alternative speech recognizer 132 towards "rain" to a greater extent than towards "snow" and "rain."

In some additional implementations, the speech recognizer biaser 222 also uses any combination of biasing, language model adaption, and/or beam search to adjust the alternative speech recognizer 132. The speech recognizer biaser 222 may also use feeding to update the alternative speech recognizer 132 so that the alternative speech recognizer 132 is more aware of the topicality, domain, and/or linguistic context of the conversation. The speech recognizer biaser 222 may be configured to boost certain words or phrases during beam-search decoding by the alternative speech recognizer 132. The speech recognizer biaser 222 may be configured to build and/or adapt a language model on the fly for a first pass or a second pass by the alternative speech recognizer 132. The speech recognizer biaser 222 may be configured to modify the alternative speech recognizer 132 so that it uses attention over a recurrent neural network language model encoder hidden states.

In instances where the speech recognizer selector 110 selects the alternative speech recognizer 132 via decision 118, the alternative speech recognizer 132 receives the acoustic features 205 from the audio subsystem 202 or from a storage device that stores the acoustic features 205 received from the audio subsystem 202. The alternative speech recognizer 132 performs speech recognition on the acoustic features 205 corresponding to an utterance and stores a transcription 230 (e.g., transcription 146, 146 of FIG. 1) of the utterance in memory hardware. Here, when performing speech recognition on the acoustic features 205, the alternative speech recognizer 132 may be biased by the bias terms 224 identified by speech recognizer biaser 222 from the ASR result(s) 218 generated by the general speech recognizer 124 from previous utterances of the conversation spoken by the speaker with typical speech.

A user interface generator 232 accesses/receives the transcription(s) 230 from the alternative speech recognizer 132 and generates a user interface 150 that includes the alternative speech recognizer transcriptions 230. The ASR system 200 outputs the user interface 150 on a display in communication with the system 200. For instance, the ASR system 200 may output the user interface 150 on a display of the user device 106a associated with the user 102a of FIG. 1 that speaks with typical speech. Notably, the second transcription 230 is canonical text so that the first user 102a can understand the second utterance 134 spoken by the second user 102b with atypical speech.

In some implementations, the ASR system 200 includes a speech synthesizer 234 that generates synthesized speech 236 of the transcriptions 230 generated by the alternative speech recognizer 132. The synthesizer 234 may include a text-to-speech module/system. The ASR system 200 may output the synthesized speech 236 through a speaker or other audio output device. For instance, the ASR system 200 may output the synthesized speech 236 through a speaker of the user device 106a associated with the user 102a of FIG. 1 that speaks with typical speech. Here, the synthetic speech representation 236 corresponds to canonical speech that conveys utterances 134, 142 spoken by the second user 102b that speaks with atypical speech.

When the ASR system 200 uses the general speech recognizer 124 to perform speech recognition, then the ASR system 200 deactivates or bypasses performing speech recognition on the alternative speech recognizers 132. When the ASR system 200 uses one of the alternative speech recognizers 132, then the ASR system 200 may deactivate or bypass performing speech recognition on the general speech recognizer 124 and any other alternative speech recognizers 132.

Figure 4:
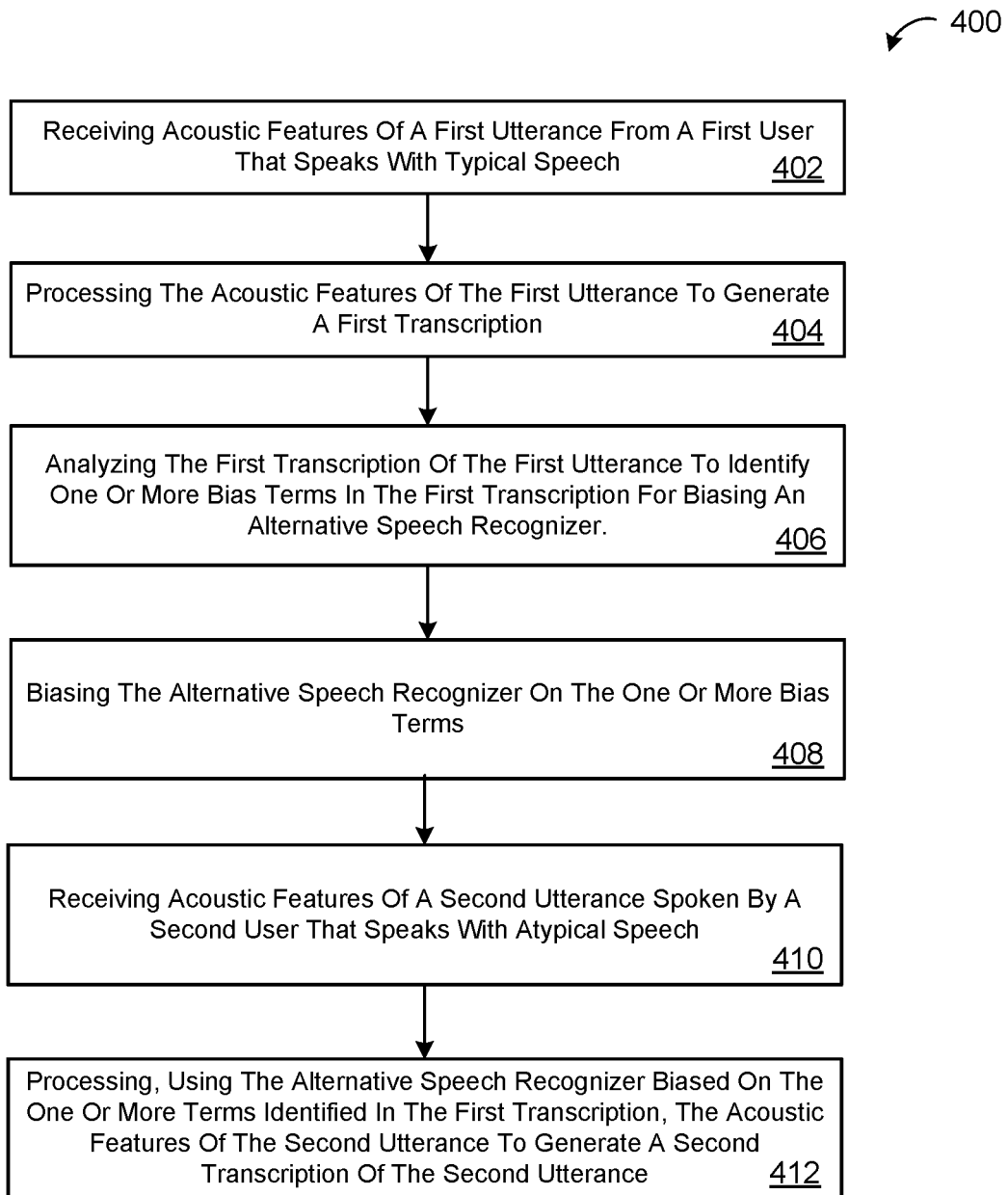
FIG. 4 is a flowchart of an example arrangement of operations for a method of performing speech recognition on typical speech and atypical speech.

FIG. 4 is a flowchart of an example arrangement of operations for a method 400 of biasing an alternative speech recognizer 132. The alternative speech recognizer 132 may be trained to perform automated speech recognition (ASR) on speech spoken by a user with atypical speech. Data processing hardware 510 (FIG. 5) may execute instructions stored on memory hardware 520 (FIG. 5) to perform the operations for the method 400. The data processing hardware 510 and memory hardware 520 may reside on a user device 106 associated with a user 102 or a remote computing device (e.g., a server) in communication with the user device 106. The method 400 may be described with reference to FIGS. 1 and 2.

At operation 402, the method 400 includes receiving acoustic features 205 of a first utterance 108 spoken by a first user 102a that speaks with typical speech, and at operation 404, the method 400 includes processing, using a general speech recognizer 124, the acoustic features of the first utterance 108 to generate a first transcription (i.e., ASR result) 218 of the first utterance 108.

At operation 406, the method 400 includes analyzing the first transcription 218 of the first utterance 108 to identify one or more bias terms 224 in the first transcription 218 for biasing an alternative speech recognizer 132. At operation 408, the method 400 includes biasing the alternative speech recognizer 132 on the one or more bias terms 224 identified in the first transcription 218. At least a portion of the one or more bias terms 224 may be associated with bias terms related to a topic or class identified in the first transcription 218. For example, if the transcriptions 218 generated by the general speech recognizer 124 are related to politics, then the method 400 may bias the alternative speech recognizer 132 on a set of one or more bias terms 224 related to politics.

At operation 410, the method 400 includes receiving acoustic features 205 of a second utterance 134 spoken by a second user 102b that speaks with atypical speech. At operation 412, the method 400 includes processing, using the alternative speech recognizer 132 biased on the one or more bias terms 224 identified in the first transcription 224, the acoustic features 205 of the second utterance 134 to generate a second transcription 230 of the second utterance 134.

In some examples, the computing device 106 displays the second transcription 146 of the second utterance 134 in a graphical user interface 150 so that the first user 104. Notably, the second transcription 230 is canonical text so that the first user 102a can understand the second utterance 134 spoken by the second user 102b with atypical speech. Additionally or alternatively, the method 400 may further generate, using a synthesizer (e.g., text-to-speech module) 234, a synthetic speech representation 236 for the second transcription 230 and audibly output the synthetic speech representation 236 from the computing device 106. Here, the synthetic speech representation 236 corresponds to canonical speech that conveys the second utterance 134 spoken by the second user 102b that speaks with atypical speech.

Figure 5:
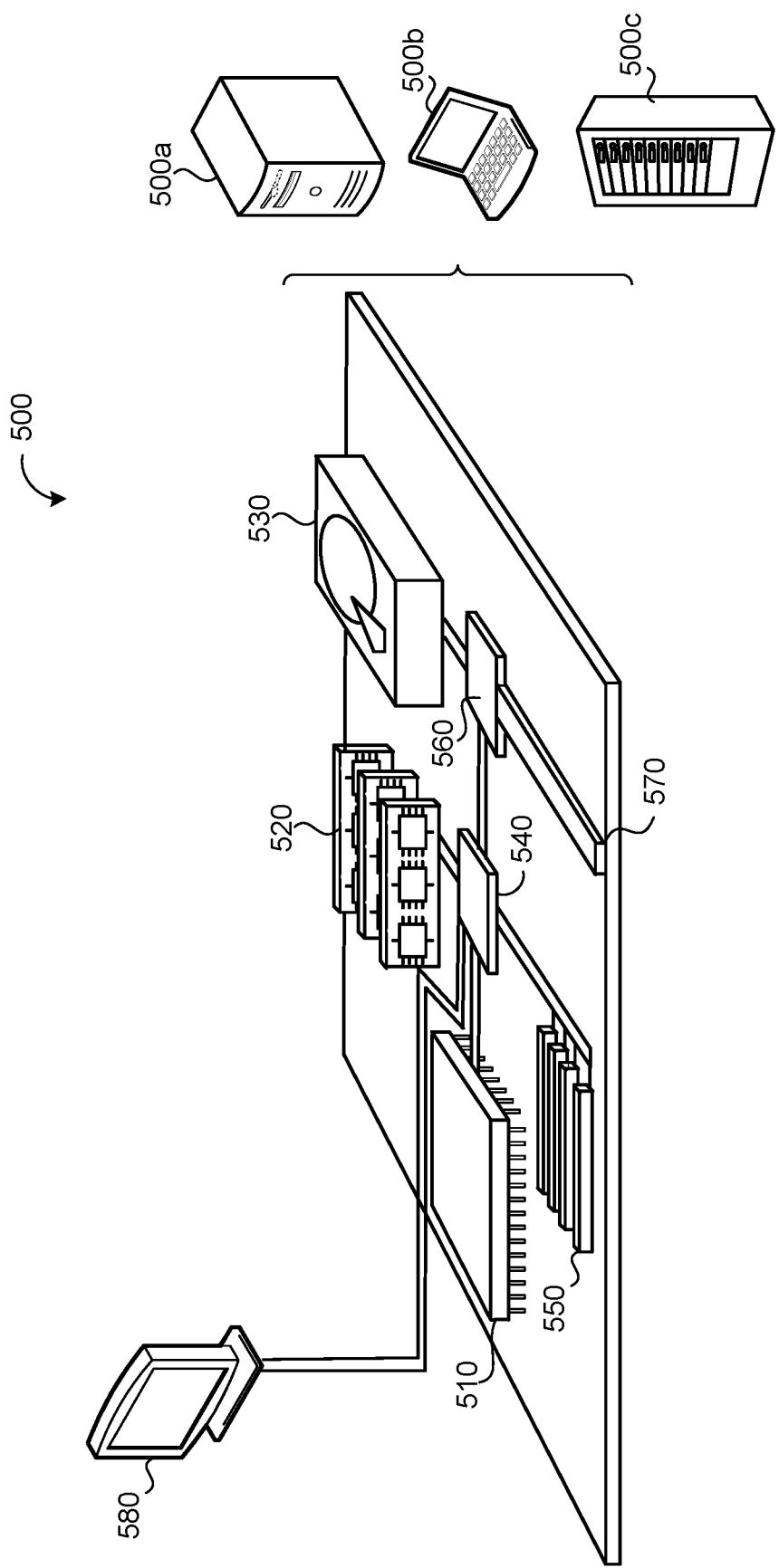
FIG. 5 is a schematic view of an example computing device that may be used to implement the systems and methods described herein.

FIG. 5 is schematic view of an example computing device 500 that may be used to implement the systems (e.g., the speech recognizer 200) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 540, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that executed on data processing hardware that causes the data processing hardware to perform operations comprising:
   receiving acoustic features of a first utterance spoken by a first user during a conversation with a second user;
   processing, using a first speech recognizer associated with the first user, the acoustic features of the first utterance to generate a first transcription of the first utterance, the first transcription comprising one or more bias terms;
   biasing a second speech recognizer based on the one or more bias terms of the first transcription, the second speech recognizer associated with the second user;
   during the conversation with the user, receiving acoustic features of a second utterance spoken by the second user; and
   processing, using the second speech recognizer biased based on the one or more bias terms, the acoustic features of the second utterance to generate a second transcription of the second utterance.

2. The computer-implemented method of claim 1, wherein:
   the first user speaks with a first type of speech;
   the first speech recognizer is trained on training utterances spoken by speakers that speak with the first type of speech;
   the second user speaks with a second type of speech different than the first type of speech spoken by the first user; and
   the second speech recognizer is trained on training utterances spoken by speakers that speak with the second type of speech.

3. The computer-implemented method of claim 2, wherein the training utterances spoken by the speakers that speak with the second type of speech include utterances spoken by speakers who have at least one of apraxia of speech, deaf speech, cluttering, developmental verbal dyspraxia, dysarthria, dysprosody, a speech sound disorders, slurred speech, stuttering, a voice disorder, or a lisp.

4. The computer-implemented method of claim 1, wherein the operations further comprise identifying the one or more bias terms by identifying non-functional terms in the first transcription.

5. The computer-implemented method of claim 1, wherein the operations further comprise performing a term frequency-inverse document frequency (tf-idf) analysis on the first transcription to identify the one or more bias terms.

6. The computer-implemented method of claim 1, wherein the operations further comprise identifying mutual information included in multiple transcriptions generated by the general speech recognizer during the conversation between the first user and the second user.

7. The computer-implemented method of claim 1, wherein:
   the first utterance is captured by a first user device associated with the first user; and
   the data processing hardware resides on the first user device.

8. The computer-implemented method of claim 1, wherein:
   the first utterance is captured by a first user device associated with the first user; and
   the data processing hardware resides on a remote computing device in communication with the first user device.

9. The computer-implemented method of claim 1, wherein the operations further comprise displaying the second transcription of the second utterance on a display of a user device associated with the first user.

10. The computer-implemented method of claim 1, wherein the operations further comprise:
    generating a synthetic speech representation for the second transcription of the second utterance; and
    providing the synthetic speech representation for audible output from a user device associated with the first user.

11. A system comprising:
    data processing hardware; and
    memory hardware in communication with the data processing hardware and storing instructions that when executed on the data processing hardware cause the data processing hardware to perform operations comprising:
      receiving acoustic features of a first utterance spoken by a first user during a conversation with a second user;
      processing, using a first speech recognizer associated with the first user, the acoustic features of the first utterance to generate a first transcription of the first utterance, the first transcription comprising one or more bias terms;
      biasing a second speech recognizer based on the one or more bias terms of the first transcription, the second speech recognizer associated with the second user;
      during the conversation with the user, receiving acoustic features of a second utterance spoken by the second user; and
      processing, using the second speech recognizer biased based on the one or more bias terms, the acoustic features of the second utterance to generate a second transcription of the second utterance.

12. The system of claim 11, wherein:
    the first user speaks with a first type of speech;
    the first speech recognizer is trained on training utterances spoken by speakers that speak with the first type of speech;
    the second user speaks with a second type of speech different than the first type of speech spoken by the first user; and
    the second speech recognizer is trained on training utterances spoken by speakers that speak with the second type of speech.

13. The system of claim 12, wherein the training utterances spoken by the speakers that speak with the second type of speech include utterances spoken by speakers who have at least one of apraxia of speech, deaf speech, cluttering, developmental verbal dyspraxia, dysarthria, dysprosody, a speech sound disorders, slurred speech, stuttering, a voice disorder, or a lisp.

14. The system of claim 11, wherein the operations further comprise identifying the one or more bias terms by identifying non-functional terms in the first transcription.

15. The system of claim 11, wherein the operations further comprise performing a term frequency-inverse document frequency (tf-idf) analysis on the first transcription to identify the one or more bias terms.

16. The system of claim 11, wherein the operations further comprise identifying mutual information included in multiple transcriptions generated by the general speech recognizer during the conversation between the first user and the second user.

17. The system of claim 11, wherein:
    the first utterance is captured by a first user device associated with the first user; and the data processing hardware resides on the first user device.

18. The system of claim 11, wherein:
the first utterance is captured by a first user device associated with the first user; and
the data processing hardware resides on a remote computing device in communication with the first user device.

19. The system of claim 11, wherein the operations further comprise displaying the second transcription of the second utterance on a display of a user device associated with the first user.

20. The system of claim 11, wherein the operations further comprise:
generating a synthetic speech representation for the second transcription of the second utterance; and
providing the synthetic speech representation for audible output from a user device associated with the first user.

* * * * *